(12) United States Patent
Chen et al.

(10) Patent No.: US 7,778,326 B1
(45) Date of Patent: Aug. 17, 2010

(54) SYSTEM AND METHOD FOR DYNAMICALLY DETERMINING MULTIMEDIA TRANSMISSION BASED ON COMMUNICATION BANDWIDTH

(75) Inventors: Yihsiu Chen, Middletown, NJ (US); Mark J. Foladare, East Brunswick, NJ (US); Shelley B. Goldman, East Brunswick, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1596 days.

(21) Appl. No.: 10/742,851

(22) Filed: Dec. 23, 2003

(51) Int. Cl.
 *H04N 7/12* (2006.01)
 *H04J 3/22* (2006.01)
(52) U.S. Cl. .................. 375/240.01; 370/468
(58) Field of Classification Search ............ 375/240.01, 375/240.28, 240.02; 709/233, 231, 204; 370/468
See application file for complete search history.

(56) References Cited

U.S. PATENT DOCUMENTS

| | | | |
|---|---|---|---|
| 6,014,694 A | | 1/2000 | Aharoni et al. |
| 6,167,084 A | * | 12/2000 | Wang et al. ............ 375/240.02 |
| 6,292,834 B1 | * | 9/2001 | Ravi et al. .................. 709/233 |
| 6,373,855 B1 | * | 4/2002 | Downing et al. ............ 370/468 |
| 2003/0055995 A1 | | 3/2003 | Ala-Honkola |
| 2003/0067872 A1 | | 4/2003 | Harrell et al. |
| 2003/0198184 A1 | | 10/2003 | Huang et al. |
| 2005/0010638 A1 | * | 1/2005 | Richardson et al. ......... 709/204 |
| 2005/0021804 A1 | * | 1/2005 | Hameleers et al. .......... 709/231 |

\* cited by examiner

*Primary Examiner*—Gims S Philippe

(57) ABSTRACT

A system and method is provided for dynamically adjusting one or more characteristics of a multimedia transmission between a content provider and a content recipient. In one embodiment, the system responds to a change in available bandwidth between the content provider and the content recipient.

18 Claims, 2 Drawing Sheets

SYSTEM AND METHOD FOR DYNAMICALLY DETERMINING MULTIMEDIA TRANSMISSION BASED ON COMMUNICATION BANDWIDTH

BACKGROUND

1. Field of the Invention

The present invention relates generally to multimedia systems and methods and, more particularly, to a system and method for dynamically determining multimedia transmission based on communication bandwidth.

2. Introduction

The increasing accessibility to the Internet has fueled a corresponding increase in the accessibility of multimedia content. Users are becoming increasingly accustomed to accessing various forms of multimedia content such as movie trailers, news clips, sporting highlights, etc. As is well known, the user experience in accessing various forms of multimedia content is highly dependent on the bandwidth capacity of a user's network Internet connection.

Traditional dial-up connections at 56 k have continued to represent the dominant form of user access to the network (e.g., Internet). While higher bandwidth integrated services digital network (ISDN) services have existed for some time, only recently have cable, satellite and digital subscriber line (DSL) service providers been able to significantly accelerate the proliferation of broadband network access.

Broadband network access has enabled significant improvements with a user's experience in accessing multimedia content. A most notable example is the support of higher frame resolution levels through the higher bandwidth connections.

As a user's network connection has significant implications on his experience with multimedia content, what is needed is a mechanism that maximizes a user's experience based on the available bandwidth.

SUMMARY

In accordance with the present invention, a process is provided for dynamically adjusting one or more characteristics of a multimedia transmission between a content provider and a content recipient. In one embodiment, the system responds to a change in available bandwidth between the content provider and the content recipient.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
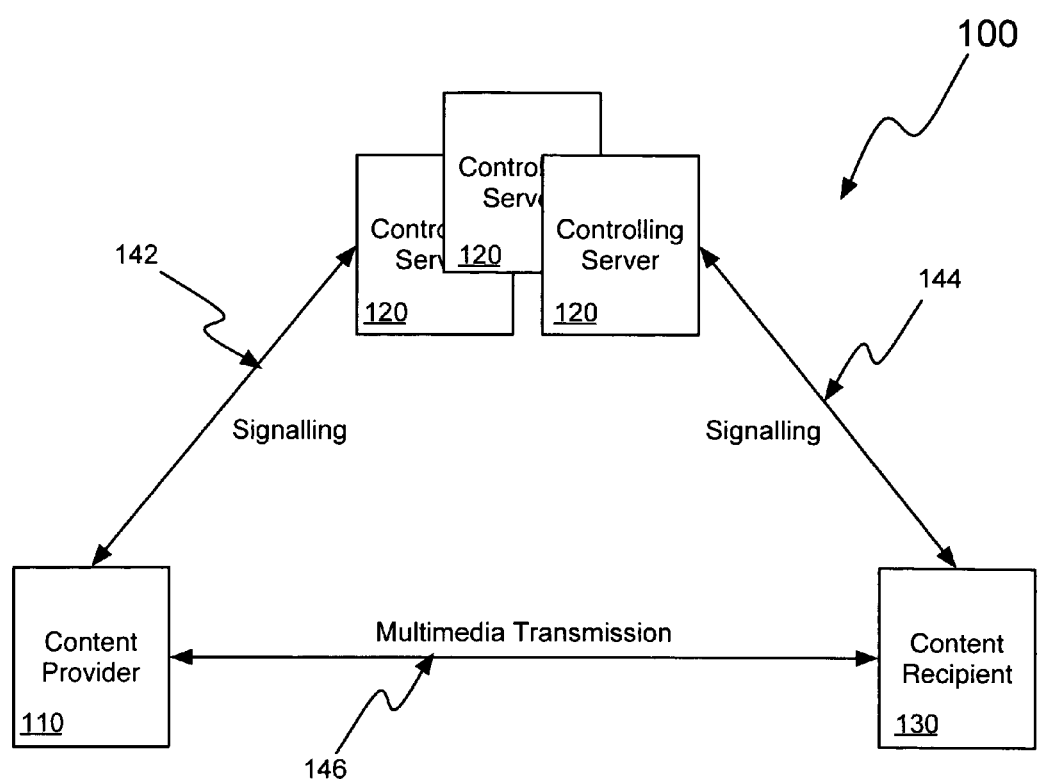
FIG. 1 illustrates an embodiment of a system of the present invention.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

As noted, a wide range of network access options are currently available to users. With the accelerating proliferation of broadband cable or DSL connections, users are becoming increasingly familiar with the benefits of higher bandwidth connections. These benefits are significant whenever multimedia content is being accessed.

Due to the range of connection speeds that currently exist amongst users, many applications rely on a user's specification of connection speed to dictate the quality of the multimedia experience. For example, when a content provider makes a streaming video (e.g., movie trailer) available to various users (or content recipients), the content provider first presents the user with various choices of media resolution (e.g., small, medium, large) before commencing with delivery of the multimedia stream. This choice by the user is typically based on the bandwidth of the user's connection. If the user is on a dial-up connection, then the smallest resolution will be most suitable. Conversely, if the user is on a high-bandwidth cable connection, then the largest resolution may be suitable.

If the user selects a resolution that is unsupportable by the user's connection, then the multimedia experience will be less than satisfactory resulting in a multimedia stream that can skip, jump, or halt. Unfortunately, once the user has made a selection, the user is stuck with that particular resolution for the duration of the multimedia stream. Modification to the selection can be effected by restarting the multimedia stream.

It should be noted that unsatisfactory results in viewing multimedia content are not restricted with those users that are hampered by low-bandwidth connections. Even high-bandwidth users can have unsatisfactory results when viewing a multimedia stream. This fact is a consequence of variations in a user's connection bandwidth. These variations can depend on many aspects of a network connection (e.g., Internet, private network, or the like), such as packet loss, packet collision, sharing of common transport, etc., and can prevent the connection from operating at its ideal top-rated speed.

Accounting for these variations in bandwidth can result in a less than ideal multimedia experience. For example, when faced with a choice of resolutions, a user may select a lower resolution that he believes would be sufficient to accommodate potential drops in connection bandwidth. This choice would often be driven by a user's desire to ensure a smooth playback of the multimedia stream. As would be appreciated, this initial user choice would result in a resolution that would often be lower than a resolution level that could be sustained for good portions of the multimedia stream.

It is therefore a feature of the present invention that a user's multimedia experience can be maximized with respect to a user's available connection bandwidth. As described in greater detail below, this maximization is based on a dynamic adjustment mechanism that can modify characteristics of a multimedia stream during the playback of the multimedia stream. These modifications can be in response to a decrease or an increase in available connection bandwidth.

To illustrate the various features of the present invention, reference is made first to the system diagram of FIG. 1. As illustrated in FIG. 1, multimedia system 100 includes a content provider 110, a content recipient 130, and one or more controlling servers 120. Here, content provider 110 can represent any system on a network that operates as a source of multimedia content, while content recipient 130 can represent any system on the network that receives the multimedia content via multimedia transmission channel 146. Here, it should be noted that in the context of a generic point-to-point connection between two users (e.g., video call), each user could functionally operate as both a content provider and a content recipient in the two-way multimedia transmission. In this scenario, changes in the available bandwidth of the connection would produce an impact on both ends of the connection.

As illustrated in FIG. 1, controlling servers 120 can represent any collection of one or more systems that assist in the establishment of a connection between content provider 110 and content recipient 130. As part of this process, controlling servers 120 communicate with content provider 110 and content recipient 130 via signaling channels 142 and 144, respectively. In general, signaling channels 142, 144 enable an exchange of information that can be used to set up multimedia transmission channel 146 for use between content provider 110 and content recipient 130.

In one embodiment, signaling between controlling servers 120 and content provider 110 and content recipient 130 are based on the Session Initiation Protocol (SIP), which is the Internet Engineering Task Force's (IETF's) standard for multimedia conferencing over IP. In general, SIP is an ASCII-based, application layer control protocol that can be used to establish, maintain, and terminate connections between two or more end points. SIP is described in greater detail in RFC 2543-SIP: Session Initiation Protocol, which is incorporated by reference herein in its entirety.

In general, the dynamic adjustment mechanism of the present invention operates to adjust, during an established multimedia transmission, one or more characteristics of the multimedia transmission that can affect the bandwidth required to accommodate the multimedia transmission. In one embodiment, three characteristics of the multimedia stream can be adjusted either alone or in combination: the video resolution level, the frame rate, and the audio compression level. The basis for this adjustment and the specific form of the adjustment is dependent on a recognized change in the bandwidth available to support the multimedia transmission.

In one embodiment, the available bandwidth is determined through the detection of the current transmission level between content provider 110 and content recipient 130. This detection process can be embodied in various forms and in various parts of the network. For example, the detection process can be based on a monitoring of packets as they traverse the network. In general, as multimedia transmission channel 146 can traverse multiple networks, specific measures of network performance can be gained at various points in various networks to determine the bandwidth bottleneck. Regardless of where the information is generated, the ultimate provision of its detection to one of the controlling servers 120 enables a dynamic adjustment mechanism to be effected.

Figure 2:
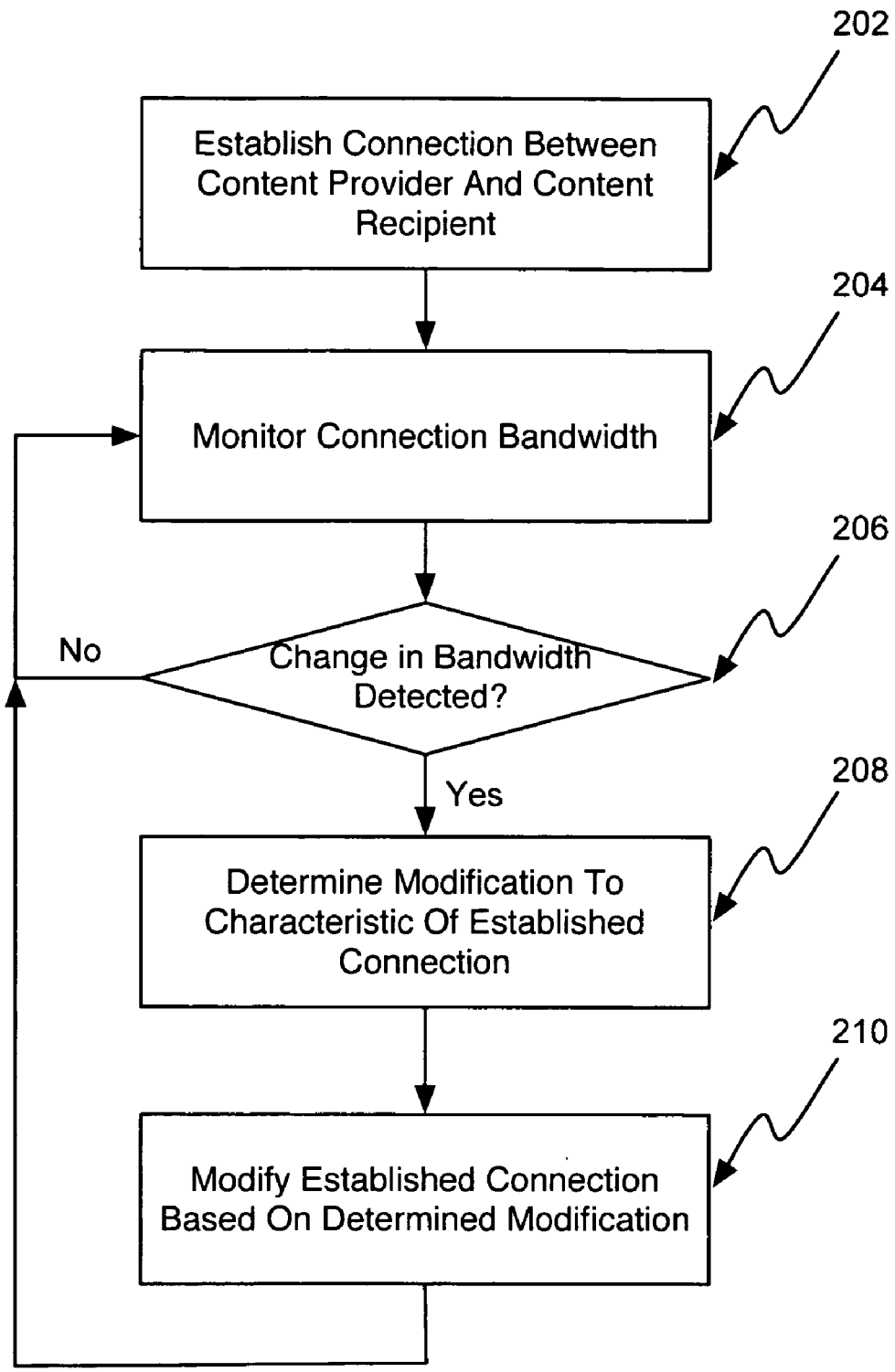
FIG. 2 illustrates a flowchart of a method of the present invention.

To illustrate this process, reference is made to the flowchart of FIG. 2. As illustrated, the process begins at step 202 where a connection is established between content provider 110 and content recipient 130. As noted, in one embodiment, the connection can be a SIP-based connection. As part of this process, controlling server(s) 120 can be used to determine the media capabilities of content provider 110 and content recipient 130. Here, the Session Description Protocol (SDP) can be used to assist in the determination of the lowest level of common services (e.g., connection bandwidth) between content provider 110 and content recipient 130. Based on this determined lowest level of common services, characteristics (e.g., video resolution level, frame rate, and audio compression level) of the multimedia transmission can then be determined.

After the connection has been established, the process continues to step 204 where the bandwidth between content provider 110 and content recipient 130 is monitored. If it is determined at step 206 that no changes in bandwidth are detected, then the monitoring process continues. If it is determined at step 206 that a change in bandwidth (higher or lower) is detected in any part of the network supporting multimedia transmission channel 146, then a dynamic adjustment process is invoked.

As noted above, the change in bandwidth between content provider 110 and content recipient 130 can be detected by monitoring elements at various points in the network. This detection represents an actual change in bandwidth between content provider 110 and content recipient 130.

It should be noted, however, that a bandwidth change can also be the result of a self-imposed constraint adopted by either content provider 110 or content recipient 130. For example, assume that content provider 110 recognizes that a portion of his outgoing bandwidth is needed for delivery of additional data to content recipient 130. As would be appreciated, this additional data can be part of the same session as the multimedia transmission or can be part of an entirely different session. Regardless, this additional data delivery will use up a portion of the bandwidth dedicated to content recipient 130 and may therefore require an adjustment in one or more characteristics of the multimedia transmission to accommodate the transmission of the additional data. In general, any delivery of additional data to content recipient 130 or to another party could impact the outgoing bandwidth from content provider 110 and would therefore necessitate a change in the multimedia transmission to content recipient 130.

Regardless of the cause, a change in bandwidth detected at step 206 will lead to the dynamic adjustment process beginning at step 208. Specifically, at step 208, a modification to one or more characteristics of the established connection is identified. In one embodiment, these characteristics include the video resolution level, the frame rate and the audio compression level.

Each of these characteristics can be defined at discrete levels, the transitions between which will involve a positive or negative change in required bandwidth. These positive and negative changes in bandwidth can be used to determine the needed modifications to accommodate the detected change in bandwidth. As would be appreciated, these changes for particular characteristics can be evaluated independently or in combination.

Consider for example a system that can implement the following discrete levels of multimedia transmission characteristics: video resolution levels of 176×144, 320×240 and 640×480; frame rates of 5, 10, 15, and 30 frames/sec; and audio compression levels of 8 kbps (based on the G.729 codec) and 64 kbps (based on the G. 711 codec). Assume further that the multimedia transmission is initially established at video resolution of 320×240, a frame rate of 30, and an audio compression level of 8 kbps.

If it is detected that an increase in available bandwidth has occurred, then the system could determine that the video resolution level can be increased to 640×480. If, however, the system determines that the increase in bandwidth would not support an increase in the video resolution level to 640×480, then the system could then choose to decrease the audio compression level to 64 kbps, thereby increasing the sound quality of the transmission. Of course, if the bandwidth change can accommodate both an increase in the video resolution level to 640×480 and a decrease in the audio compression level, then both of those modification could be effected.

If it is detected that a decrease in available bandwidth has occurred, then the system could determine that the video resolution level and/or the frame rate should be decreased. The specific amount of the decrease in the video resolution level and/or the frame rate would be based on the amount of the reduction in available bandwidth. For example, if a large decrease in available bandwidth is detected, the system could choose to reduce the video resolution level to 176×144 and the frame rate to 5 frames/sec. In an extreme case, where the available bandwidth is drastically cut, the system could also choose to eliminate the video portion of the stream altogether and transmit only the audio component.

While various methods of adjustment can be used in balancing the changes in the video resolution level, the frame rate and the audio compression level, one of the goals of the process is to maintain a smooth multimedia stream. This goal can dictate a combination of changes that would be more permissible than others. For example, the system could be designed to reduce the video resolution levels before it reduced the frame rate. As would be appreciated, the specific methods of adjustment would be implementation dependent and would not alter the principles of the present invention.

In one embodiment, either party to the connection can place their own constraints on the methodology by which the adjustments are to be made. To illustrate this concept consider a general point-to-point connection between two users (A and B). In this scenario, either party could not only decide whether to place an artificial constraint on the available bandwidth, but also decide the methodology by which the adjustments to one or more of the video resolution level, the frame rate and the audio compression level are made. For example, user A could choose to sacrifice the video resolution level first and the audio compression level last upon a change (actual or self imposed by user A) in bandwidth, while user B could choose to sacrifice the video frame rate first and the video resolution level last upon a change (actual or self imposed by user B) in bandwidth. These options can be entered into the system as user-selectable preferences.

After the modifications are determined at step 208, the modifications are then placed in effect at step 210. More specifically, the established connection is modified in midstream in a process governed by controlling server 120. This midstream modification would seek to maximize the user's experience given the current bandwidth constraints. Here, it is significant that the characteristics of the multimedia transmission occur automatically without relying on a user's specification.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents only should define the invention, rather than any specific examples given.

What is claimed is:

1. A method of dynamically adjusting a multimedia transmission between a content provider and a content recipient, comprising:
   during a multimedia transmission of a multimedia stream that occurs at a video resolution level, a frame rate, and an audio compression level, receiving an indication of a change in available bandwidth between the content provider and the content recipient;
   determining, based on said received indication, an adjustment to one or more of said video resolution level or said audio compression level of said multimedia stream; and
   coordinating, via a server, a change between said content provider and said content recipient to continue said multimedia transmission based on the determined adjustment to said one or more of said video resolution level or said audio compression level.

2. The method of claim 1, wherein said received indication is an indication of a monitored change in available bandwidth between said content provider and said content recipient.

3. The method of claim 1, wherein said received indication is an indication of a self imposed reduction in bandwidth.

4. The method of claim 1, wherein said determining comprises determining to adjust only the video resolution level.

5. The method of claim 1, wherein said determining comprises determining to adjust only the audio compression level.

6. The method of claim 1, wherein said determining comprises determining to adjust both the video resolution level and a frame rate.

7. The method of claim 1, wherein said coordinating is handled by a network server.

8. The method of claim 7, wherein said coordinating is based on a session initiation protocol (SIP).

9. The method of claim 1, wherein said coordinating is performed by a content provider server.

10. The method of claim 1, wherein said determining comprises considering a user selected preference.

11. A method in a controlling server of dynamically adjusting a multimedia transmission between a content provider and a content recipient, comprising:

during a multimedia transmission of a multimedia stream that occurs at a video resolution level, a frame rate level, and an audio compression level, receiving an indication of a change in available bandwidth between the content provider and the content recipient, said received indication being communicated to the controlling server via a session initiation protocol (SIP); and coordinating, via a server, a change between said content provider and said content recipient such that a continued multimedia transmission between said content provider and said content recipient has a modification of at least one of: said video resolution level or said audio compression level of said multimedia stream.

12. The method of claim 11, wherein said received indication is an indication of a monitored change in available bandwidth between said content provider and said content recipient.

13. The method of claim 11, wherein said received indication is an indication of a self imposed reduction in bandwidth.

14. The method of claim 11, wherein said modification comprises at least two of: said video resolution level, said frame rate level, or said audio compression level.

15. The method of claim 14, wherein said modification is based on a user selected preference.

16. A computer-readable medium that stores a program for controlling a computer device to perform a method in a controlling server of dynamically adjusting a multimedia transmission between a content provider and a content recipient, the method comprising:

during a multimedia transmission of a multimedia stream that occurs at a video resolution level, a frame rate level, and an audio compression level, receiving an indication of a change in available bandwidth between the content provider and the content recipient, said received indication being communicated to the controlling server via a session initiation protocol (SIP); and coordinating a change between said content provider and said content recipient such that a continued multimedia transmission between said content provider and said content recipient has modified at least one of: said video resolution level or said audio compression level of said multimedia stream.

17. The computer-readable medium of claim 16, wherein said received indication is an indication of a monitored change in available bandwidth between said content provider and said content recipient.

18. The computer-readable medium of claim 16, wherein said received indication is an indication of a self imposed reduction in bandwidth.

* * * * *